United States Patent [19]
Day

[11] Patent Number: 6,025,428
[45] Date of Patent: Feb. 15, 2000

[54] RUBBER COMPOSITION AND METHOD OF INCORPORATING SILICA FILLER

[75] Inventor: Gary L. Day, Hudson, Ohio

[73] Assignee: Hankook Tire Co., Ltd., Kangnam-gu, Rep. of Korea

[21] Appl. No.: 09/141,836

[22] Filed: Aug. 28, 1998

[51] Int. Cl.[7] .................................................. C08K 3/00
[52] U.S. Cl. ............................................ 524/492; 524/493
[58] Field of Search .................................... 524/492, 493

[56] References Cited

U.S. PATENT DOCUMENTS

| | | | |
|---|---|---|---|
| 3,627,723 | 12/1971 | Kealey et al. | 260/41.5 R |
| 3,686,113 | 8/1972 | Burke, Jr. | 260/33.6 |
| 3,689,452 | 9/1972 | Burke, Jr. | 260/33.6 |
| 3,840,382 | 10/1974 | Burke | 106/288 B |
| 3,972,850 | 8/1976 | Hamilton et al. | 260/37 SB |
| 3,998,778 | 12/1976 | Berg et al. | 260/33.6 AQ |
| 4,032,501 | 6/1977 | Schulz | 260/33.6 AQ |
| 4,590,052 | 5/1986 | Chevallier et al. | 423/335 |
| 4,602,052 | 7/1986 | Weber et al. | 523/215 |
| 4,861,842 | 8/1989 | Cohen et al. | 525/329.3 |
| 5,187,239 | 2/1993 | Parks et al. | 525/329.3 |
| 5,227,425 | 7/1993 | Rauline | 524/493 |

*Primary Examiner*—Edward J. Cain
*Attorney, Agent, or Firm*—Pearne, Gordon, McCoy & Granger LLP

[57] ABSTRACT

A method of optimizing the effects of silica fillers in tire tread rubber compounds includes the use and ordered addition of both dispersing and coupling agents during the rubber mixing process.

21 Claims, No Drawings

RUBBER COMPOSITION AND METHOD OF INCORPORATING SILICA FILLER

BACKGROUND OF THE INVENTION AND RELATED ART

The present invention relates to sulfur-vulcanizable rubber compositions having a silica filler incorporated with optimization of the silica associated properties relating to wear, wet traction and rolling resistance. The silica associated properties are promoted by dispersing and coupling agents and, more particularly, the silica dispersion is improved through the use of a dispersing agent or aid comprising a quaternary ammonium compound and the timely addition thereof during the rubber mixing or blending process so as to not unnecessarily inhibit the coupling agent enhancements. The rubber compositions are particularly useful for tire tread applications in vehicles, for example passenger automobiles and trucks.

In recent rubber compounding developments, silica has been added to tire tread compositions as a filler to replace some or all of the carbon black filler. Although more costly than carbon black, the advantages of silica include improved wet traction with reduced fuel consumption. The disadvantages encountered in the use of silica include processing difficulties and reduced wear. The wear reduction is believed to be associated with the less uniform silica dispersion properties and decreased reinforcement characteristics of silica as compared with carbon black.

The difficulties in dispersing silica are believed to be associated with the polar nature of silica and non-polar nature of rubber. Regardless, the silica has been found to form localized clumps or aggregations in the rubber which detract from both tire wear and fuel consumption. As compared with carbon black, silica does not react as strongly with the rubber and thereby tends to give less strength to the rubber.

It is known to use coupling agents to enhance the rubber reinforcement characteristics of silica. A coupling agent is a bi-functional molecule that will react with the silica at one end thereof and cross-link with the rubber at the other end thereof. In this manner, the reinforcement and strength of the rubber are improved, e.g. the toughness, strength, modulus, tensile and abrasion resistance are particularly improved. The coupling agent is believed to cover the surface of the silica particle which then hinders the silica from aggregating with other particles. By interfering with the aggregation process, the dispersion is improved and therefore the wear and fuel consumption are improved.

The use of silica in relatively large proportions for improving various tire properties has been found to undesireably slow the cure rate of the rubber. This has led to the use of secondary accelerators such MBT, MBTS or DPG to maintain an adequate cure rate.

U.S. Pat. No. 4,602,052 discloses that small amounts of quaternary ammonium compounds may be used to speed up the cure rate, increase tensile and modulus, and decrease hysteresis in natural rubber containing compositions incorporating carbon black. The quaternary ammonium compounds are used as coupling agents for the carbon black filler. This patent references U.S. Pat. Nos. 3,686,113, 3,689,452 and 3,840,382 which are directed to aqueously wet never dried silica pigment precipitate or wet silica. The patent teachings further relate the preparation of elastomer-silica master batches, to silica coated with oleophylic quaternary ammonium material that is dried and dispersable in rubber, and to beads of silica combined with quaternary ammonium compounds and combined with other compounds such as processing oil and carbon black.

U.S. Pat. No. 3,627,723 teaches an alpha-olefin/non-conjugated diene copolymer with a clay or (carbon black filler using surfactants to improve the extrudability and vulcanizate properties of the copolymer. The surfactants include quaternary ammonium compounds, and silica is mentioned as a possible filler.

U.S. Pat. No. 3,998,778 discloses a method of making a powdered and flowable rubber composition including carbon black filler and a quaternary ammonium compound as an emulsifier. U.S. Pat. No. 4,032,501 also relates to emulsion preparation using a carbon black filler and a quaternary ammonium compound as an emulsifier.

U.S. Pat. Nos. 4,861,842 and 5,187,239 teach the use of quaternary ammonium compounds as secondary accelerators in rubber compositions.

SUMMARY OF THE INVENTION

It has now been discovered that quaternary ammonium compounds may be used as dispersing agents for silica in rubber compositions to provide improvements with mitigation of detrimental effects on other constituents and their intended improvements. The dispersing agent is used in combination with coupling agents to provide improvements not achieved by the latter, and such improvements are attained without undesirable trade-offs in competing properties of wear, wet traction and rolling resistance. That is, those properties are not reduced below acceptable tire performance levels.

The order of the addition of the dispersing agent in the rubber mixing process necessarily follows or is contemporaneous with the addition of at least a portion of the coupling agent and silica. The dispersing agent should not be added to the rubber and silica prior to the coupling agent since the latter will then not adequately achieve its intended improvements in rubber strength including high modulus and tensile characteristics. This is true even though the dispersing agent will yield its improvements of hysteresis reduction and dispersion improvement.

As indicated, at least a portion of the coupling agent should be added to at least a portion of the silica before or with the dispersing agent. Typically, about one-half of the total amount of the coupling agent to be used should be added before or with the dispersing agent or a fraction thereof. As decreasing amounts of coupling agent are initially or contemporaneously added with the dispersing agent, the modulus and tensile properties as well as other strength properties of the resulting rubber composition will decrease. It should be appreciated that later added increased amounts of coupling agent will not recover the lost modulus, tensile and strength properties. The exact proportions are not critical, and suitable amounts may be readily determined by trial and error based on the resulting rubber properties in accordance with the teachings herein.

Accordingly, the improvements of the invention are based upon an insight in respect to the methods and/or modes of operation and competing effectiveness of coupling agents and dispersing agents in connection with silica filled rubber compositions. Prior to applicant's discovery, it is not believed that the relationship between coupling agents and dispersing agents in a silica filled rubber was recognized. That is, it is not believed that the competing interaction between the coupling and dispersing functions was recognized. Without being bound to a particular theory, this interaction is believed to involve characterization of the silica as providing a limited number of activity sites for coupling and/or dispersing. The dispersing activity here appears to dominate, and it must precede or be contemporaneous with the coupling activity in order to allow the latter to effectively achieve its improvement.

The delay in cure/vulcanization of rubber observed with the use of silica as noted above has been lessened, if not substantially overcome, in many cases by the dispersing agents of the present invention. This is an unexpected benefit that is not fully understood. The dispersing agents of the invention have been found to increase the cure rate and, in some instances, to fully recapture any cure slow down presumed to have resulted from the use of the silica. In this manner, the dispersing agent has enabled achievement of the silica benefits in full without this prior art disadvantage.

The phrases "rubber composition" or "rubber compound" are used interchangeably to refer to rubber which has been blended or mixed with various ingredients and materials, and such terms are well known to those having skill in the rubber mixing or rubber compounding art. The rubber compositions in accordance with the invention are particularly suitable for the manufacture of tire treads intended for, but not exclusive to, passenger cars, all-terrain vehicles, trucks and motorcycles. Such rubber or tire tread compositions in accordance with the invention may be used for the manufacture of tires or for the re-capping of worn tires.

The rubber compositions are based on conjugated diene rubber of the types conventionally used for tire treads. For example, the rubber may be selected from the group including natural rubber, polyisoprene rubber, styrene-butadiene rubber, acrylonitrile-butadiene rubber, styrene-isoprene copolymers, isoprene-butadiene copolymer, styrene-isoprene-butadiene tripolymers, and polybutadiene rubber.

The silica may be of any type that is known to be useful in connection with the reinforcing of rubber compositions. For example, the silica may have a BET surface area of between 20 and 300 m$^2$/g. However, it is believed that useful silicas comprise any highly dispersed silica in which the specific surface area is about 5 to 1000 m$^2$/g, and the major particles fall in a particle diameter range of 5 to 500 nanometer. Commercially available silicas include HISIL, 233 by PPG Industries, ULTRASIL VN3 by Degussa AG and, ZEOSIL 175 by Hanbool Corporation. ZEOPOL 8715 and ZEOPOL, 8745 by J. M. Huber Corporation and MP1165 by Rhoclia.

Useful coupling agents include those conventionally employed in connection with silica filler. Examples include, dithiodipropionic acid (DTDP) and bis[3-triethoxysilylpropyl-] tetrasulfane may be used. The latter is particularly favored, and it is commercially available from Degussa AG under the designation X50S as a 50/50 blend of carbon black and Si69 which corresponds with the bis [3-triethoxysilylpropyl-] tetrasulfane. Coupling agents marketed by OSi Specialties, Inc. include A-189, a gamma-mercaptopropyltrimethoxy silane, and A-1289, a bis[3-triethoxysilylpropyl-] tetrasulfane.

The dispersing agents useful in accordance with the invention are quaternary ammonium compounds corresponding with formula:

R1,R2,R3,NR4X  (Formula I)

where R1,R2,R3 and R4, which may be the same or different, are alkyl, aryl and polyoxyethylene; and X is halogen.

Preferred quaternary ammonium compounds correspond with the formula:

R1,R2,R3,NR4X  (Formula II)

where R1, R2, R3 and R4, which may be the same or different, are C1—C18 alkyl, benzyl and C15 polyoxyethylene; and X is chloride.

In accordance with the particular substituents, the molecular weight of the quaternary compounds may range from several hundred to a thousand and, for example, from 300 to 1000.

The dispersing agents are used in amounts in the range of from about 0.5 phr to about 10.0 phr of based on the total weight of the rubber, and more preferably, from about 4 phr to about 6 phr. The exact weight may vary in accordance with molar equivalents.

DESCRIPTION OF THE PREFERRED EMBODIMENTS

The following examples illustrate the invention. As described below, typical tire tread rubber compositions were modified by incorporating dispersing agents and coupling agents in accordance with the invention. The improvements in the rubber compositions are demonstrated using the following tests.

The stress-strain characteristics of the rubber compositions of the examples were measured in accordance with ASTM D-412, method A. These properties generally correspond with the coupling properties in that higher strength values indicate greater degrees of coupling.

It has been reported that the contribution of the tread compound to tire wet traction may be correlated to tangent delta @ 0° C. Herein, hysteresis measurements for 0° C. were made using an ARES brand tester from Rheometrics Scientific. The tests were performed in the torsion rectangular geometry using 10 Hz and 0.5% strain.

It is also recognized that the contribution of the tread compounds to tire rolling resistance may be correlated to the tangent delta of the compounds between 40° and 100° C. Hysteresis measurements for correlation to rolling loss in tires were measured using an RPA 2000 rubber process analyzer from Alpha Technologies. The compound samples were cured for 12 minutes at 168° C. with no rotor displacement. Following the 12 minute cure, the samples were cooled to 40° C. and tested at 20 Hz and strain levels varying from 0.5 to 15% to determine the value of tangent delta @ 40° C.

Dispersion quality as it relates to the relative degree of filler agglomeration and, in turn, to tire wear, may be related to the phenomenon of dynamic modulus decreasing with increasing strain which is referred to as the Payne Effect. Relatively higher amounts of modulus decrease at increasing levels of strain are believed to indicate high amounts of filler agglomeration which are broken apart at higher levels of strain. The Payne Effect is calculated as the ratio of stress at 15% strain to the stress at 0.5% strain.

The cure rate is measured using an RPA 2000 rubber process analyzer from Alpha Technologies. The cures were run for 20 minutes at 168° C. using 1.67 Hz and 1° arc rotation.

The rubber compositions of the invention may be blended in conventional apparatus by kneading the rubber component containing the conjugated diene component and other constituents including particularly the dispersing agent of the invention in combination with the ordered addition of the coupling agent. The particular apparatus may include a banbury internal mixer, a kneader, rolls or other equivalent mixing or blending apparatus known in the art.

In illustration of the invention, rubber compositions or compounds were mixed in three stages including two non-productive stages and a final productive stage. The compounds were mixed in a 1.5 liter KSBI internal mixer. Non-productive mix times were limited to six minutes and a maximum temperature of 160° C. The final productive mixed times were held at three minutes and the temperature was limited to 125° C.

| First Non-productive Mix Stage | |
|---|---|
| Natural rubber SIR-20[1] | 40.00 phr |
| S1721[2] emulsion SBR | 67.50 phr |
| 3,4 Polyisoprene[3] | 10.00 phr |
| ZEOSIL 175[4] silica | 65.00 phr |
| X50S[5] | variable |
| Dispersing agent[6] | variable |
| Wax[7] | 1.50 phr |
| Second Non-productive Mix Stage | |
| Ingredients from first stage | variable |
| Zinc Oxide | 3.00 phr |
| Stearic Acid | 1.00 phr |
| SANTOFLEX 13[8] | 1.50 phr |
| X50S | variable |
| Dispersing agent | variable |
| Third Productive Mix Stage | |
| Ingredients from second stage | variable |
| 1% oil coated sulfur | 1.75 phr |
| SANTOCURE TBBS[9] | 1.80 phr |
| PERKACIT DPG[10] | variable |
| PVI[11] | 0.30 phr |
| Dispersing agent | variable |

[1]A natural rubber sold by Akrochem.
[2]A styrene butadiene emulsion sold by Ameripol-Synpol.
[3]3,4 polyisoprene sold by Karbochem.
[4]A silica particulate sold by Hanbool Corporation.
[5]50% carbon black and 50% bis[3-triethoxysilylpropyltetrasulfane sold by Degussa
[6]Tested quaternary ammonium compound
[7]The wax is Sunproof, sold by Uniroyal Chemical Company.
[8]N-1,3,-dimethylbutyl-N'-phenyl-p-phenylenediamine sold by Flexsys.
[9]N-t-butyl-2-benzothiazyl sulfenamide from Flexsys
[10]Diphenyl guanidine from Flexsys
[11]N-(cyclohexylthio) phthalimide from Flexsys Using the above mixing procedures, examples 1 through 8 were prepared. The formulation of the compound of each example is reported in Table 1A. In the third or productive mix stage, a secondary accelerator such as diphenyl guanidine (DPG) is used as reported. The elimination of the need for the same is a further advantage of the invention.

The physical properties of the resulting compounds of examples 1 through 8 are reported in Table 1B. The test procedures described above were used to measure the reported values unless otherwise indicated.

TABLE 1A

| EXAMPLE COMPOUND NUMBER | 1 | 2 | 3 | 4 | 5 | 6 | 7 | 8 |
|---|---|---|---|---|---|---|---|---|
| FIRST NON-PRODUCTIVE STAGE | | | | | | | | |
| X50S | 0 | 5 | 5 | 5 | 5 | 0 | 0 | 0 |
| DISPERSION AID[1] | 0 | 0 | 5 | 0 | 0 | 0 | 0 | 5 |
| SECOND NON-PRODUCTIVE STAGE | | | | | | | | |
| X50S | 0 | 0 | 0 | 0 | 0 | 5 | 5 | 5 |
| DISPERSION AID[1] | 0 | 0 | 0 | 5 | 0 | 0 | 5 | 0 |
| FINAL STAGE | | | | | | | | |
| DISPERSION AID[1] | 0 | 0 | 0 | 0 | 5 | 0 | 0 | 0 |
| DPG | 0.8 | 0.8 | 0 | 0 | 0 | 0.8 | 0 | 0 |

[1]Carsoquat 868P - Dicetyl Dimethyl Ammonium Chloride, 68% active from Lonza

TABLE 1B

| EXAMPLE COMPOUND NUMBER | | 1 | 2 | 3 | 4 | 5 | 6 | 7 | 8 |
|---|---|---|---|---|---|---|---|---|---|
| DYNAMIC VISCOELASTIC PROPERTIES | | | | | | | | | |
| ARES @ 0° C., 10 Hz, 0.5% STRAIN TANGENT DELTA @ 40° C. | | 0.232 | 0.288 | 0.298 | 0.294 | 0.364 | 0.279 | 0.299 | 0.297 |
| RPA @ 40° C., 20 Hz, 5% STRAIN TANGENT DELTA @ 0° C. | | 0.171 | 0.210 | 0.152 | 0.141 | 0.133 | 0.214 | 0.166 | 0.150 |
| PAYNE EFFECT G' 15%/0.5% | | 23.0% | 26.4% | 35.4% | 39.9% | 46.0% | 25.8% | 36.8% | 34.7% |
| RPA CURE 20' @ 168° C., 1.67 Hz, 1° ARC | | | | | | | | | |
| MIN S' | dNm | 12.41 | 6.65 | 3.97 | 3.95 | 3.44 | 5.27 | 3.55 | 3.62 |
| T '30 | m.m | 1.94 | 2.56 | 3.92 | 4.32 | 2.59 | 2.88 | 4.83 | 3.90 |
| T '95 | m.m. | 3.95 | 5.00 | 6.98 | 7.21 | 5.13 | 5.45 | 8.24 | 7.76 |
| STRESS-STRAIN | | | | | | | | | |
| 300% MODULUS (kgf/cm$^2$) | | 47 | 90 | 92 | 90 | 108 | 85 | 85 | 92 |
| TENSILE (kgf/cm$^2$) | | 193 | 194 | 186 | 189 | 193 | 197 | 197 | 192 |
| ELONGATION (%) | | 749 | 547 | 521 | 527 | 479 | 571 | 561 | 537 |

Example 1 is the base compound with no coupling agent or dispersion agent. Examples 2 through 5 contain the coupling agent added in the first non-productive mix. Example 2 does not include a dispersing aid.

Referring to example 3, the addition of the quaternary ammonium chloride in the first product mix with the coupling agent shows initial increases in the tangent delta @ 0° C. as compared with examples 1 and 2. The Payne Effect as well as the tangent delta 40° C. are improved by the addition of the dispersing aid. Further improvements are seen as the dispersing aid is added at later points in the mixing process. That is, the foregoing properties each improve as the addition of the dispersing aid is moved to the second non-productive step and then to the final mix stage.

Referring to example 6, there is little difference resulting upon adding the coupling agent in the first non-productive stage as compared with example 2. However, adding the dispersing aid and the coupling agent together in the second non-productive stage in example 7 is not as effective as adding the coupling agent before the dispersing aid in example 4. Example 8 shows that the addition of the dispersing aid prior to the coupling agent results in less improvements then when the coupling agent is added prior to the dispersing aid.

Using the same mixing techniques as described above, example Nos. 9 through 14 were prepared as reported in Table 2A. In this instance, example 9 is a control example employing only the coupling agent. Referring to example 12, stearyl dimethyl benzyl ammonium chloride is used as a dispersing aid. As shown in Table 2B, the reported properties are improved over the control of example 9, and similar improvements are also shown for this quaternary ammonium chloride material as compared to its addition in earlier stages. Examples 13 and 14 particularly show improvements adding the dispersing aid in the final non-productive mix step.

TABLE 2A

| EXAMPLE COMPOUND NUMBER | 9 | 10 | 11 | 12 | 13 | 14 |
|---|---|---|---|---|---|---|
| FIRST NON-PRODUCTIVE STAGE | | | | | | |
| X50S | 5 | 5 | 5 | 5 | 5 | 5 |
| DISPERSION AID[1] | 0 | 5 | 0 | 0 | 0 | 0 |
| DISPERSION AID[2] | 0 | 0 | 0 | 0 | 4.05 | 0 |
| SECOND NON-PRODUCTIVE STAGE | | | | | | |
| X50S | 0 | 0 | 0 | 0 | 0 | 0 |

TABLE 2A-continued

| EXAMPLE COMPOUND NUMBER | 9 | 10 | 11 | 12 | 13 | 14 |
|---|---|---|---|---|---|---|
| DISPERSION AID[1] | 0 | 0 | 5 | 0 | 0 | 0 |
| FINAL STAGE | | | | | | |
| DISPERSION AID[1] | 0 | 0 | 0 | 5 | 0 | 0 |
| DISPERSION AID[2] | 0 | 0 | 0 | 0 | 0 | 4.05 |
| DPG | 0.8 | 0 | 0 | 0 | 0 | 0 |

[1]Carsoquat SDQ-85-Stearyl Dimethyl Benzyl Ammonium Chloride, 85% active from Lonza
[2]Bardac LF-80 Dioctyl Dimethyl Ammonium Chloride, 80% active from Lonza

TABLE 2B

| EXAMPLE COMPOUND NUMBER | 9 | 10 | 11 | 12 | 13 | 14 |
|---|---|---|---|---|---|---|
| DYNAMIC VISCOELASTIC PROPERTIES | | | | | | |
| ARES @ 0° C., 10 Hz, 0.5% STRAIN TANGENT DELTA @ 0° c. | 0.317 | 0.368 | 0.354 | 0.404 | 0.392 | 0.421 |
| RPA @ 40° C., 20 Hz, 5% STRAIN TANGENT DELTA @ 40° c. | 0.189 | 0.154 | 0.162 | 0.156 | 0.139 | 0.117 |
| PAYNE EFFECT G' 15%/0.5% | 34.1% | 40.3% | 33.3% | 44.8% | 38.9% | 49.5% |
| RPA CURE 20' @ 168° C., 1.67 Hz, 1° ARC | | | | | | |
| MIN S'    dNm | 6.07 | 4.74 | 5.11 | 3.73 | 4.76 | 3.67 |
| T' 30    m.m | 2.81 | 3.30 | 3.14 | 2.34 | 2.89 | 1.88 |
| T' 95    m.m | 5.9 | 5.86 | 5.37 | 4.46 | 6.05 | 4.48 |
| STRESS-STRAIN | | | | | | |
| 300% MODULUS (kgf/cm$^2$) | 93 | 99 | 91 | 87 | 120 | 124 |
| TENSILE (kgf/cm$^2$) | 206 | 196 | 189 | 206 | 203 | 210 |
| ELONGATION (%) | 555 | 518 | 522 | 574 | 472 | 468 |

Several different types of quaternary ammonium chloride materials are evaluated in examples 15 through 22 reported in Tables 3A and 3B. The difference in addition levels of the dispersing aid are weight adjustments to assure that equal molar quantities are used. In these examples, the coupling agent was incorporated in the first non-productive mixing stage and the dispersing aid was added in the final productive mixing stage in accordance with the preferred order and specific stages of addition. Example 15 is a control not employing a dispersing aid. As compared to the control, the dispersing aids were found in each instance to provide increased values for tangent delta @ 0° C., decreased values for tangent delta at 40° C. and improved Payne Effect values in the order of 20% to 30%. Further, a decrease in viscosity of the uncured compound was also observed.

TABLE 3A

| EXAMPLE COMPOUND NUMBER | 15 | 16 | 17 | 18 | 19 | 20 | 21 | 22 |
|---|---|---|---|---|---|---|---|---|
| FIRST NON-PRODUCTIVE STAGE | | | | | | | | |
| X50S | 5 | 5 | 5 | 5 | 5 | 5 | 5 | 5 |
| SECOND FINAL STAGE | | | | | | | | |
| X50S | 0 | 0 | 0 | 0 | 0 | 0 | 0 | 0 |
| FINAL STAGE | | | | | | | | |
| DISPERSION AID[1] | 0 | 0 | 0 | 0 | 0 | 0 | | |
| DISPERSION AID[2] | 0 | 0 | 7.35 | 0 | 0 | 0 | 0 | 0 |
| DISPERSION AID[3] | 0 | 0 | 0 | 17 | 0 | 0 | 0 | 0 |
| DISPERSION AID[4] | 0 | 0 | 0 | 0 | 6.25 | 0 | 0 | 0 |
| DISPERSION AID[5] | 0 | 0 | 0 | 0 | 0 | 6.25 | 0 | 0 |
| DISPERSION AID[6] | 0 | 0 | 0 | 0 | 0 | 0 | 5 | 0 |

TABLE 3A-continued

| EXAMPLE COMPOUND NUMBER | 15 | 16 | 17 | 18 | 19 | 20 | 21 | 22 |
|---|---|---|---|---|---|---|---|---|
| DISPERSION AID[7] | 0 | 0 | 0 | 0 | 0 | 0 | 0 | 5 |
| DPG | 0.8 | 0 | 0 | 0 | 0 | 0 | 0 | 0 |

[1]Carsoquat SDQ-85-Stearyl Dimethyl Benzyl Ammonium Chloride, 85% active from Lonza
[2]Carsoquat 868P-Dicetyl Dimethyl Ammonium Chloride, 68% active from Lonza
[3]Carsoquat CT-429-Cetyl trimethyl Ammonium Chloride, 29% active from Lonza
[4]Barquat 4280-Alkyl Dimethyl Benzyl Ammonium Chloride, 80% active from Lonza
[5]Barquat MB-80-Alkyl Dimethyl Benzyl Ammonium Chloride, 80% active from Lonza
[6]Emcol CC-9-Polyoxypropylene Methyl Diethyl Ammonium Chloride, 98% active from Witco Chemical
[7]Q-18-15-Octadecyl poly (15) oxyethylene Methyl Ammonium Chloride, 100% active from Tomah Products

TABLE 3B

| EXAMPLE COMPOUND NUMBER | | 15 | 16 | 17 | 18 | 19 | 20 | 21 | 22 |
|---|---|---|---|---|---|---|---|---|---|
| DYNAMIC VISCOELASTIC PROPERTIES | | | | | | | | | |
| ARES @ 0° C., 10 Hz, 0.5% STRAIN TANGENT DELTA @ 0° C. | | 0.370 | 0.425 | 0.435 | 0.364 | 0.420 | 0.408 | 0.422 | 0.442 |
| RPA @ 40° C., 20 Hz, 5% STRAIN TANGENT DELTA @ 40° C. | | 0.194 | 0.143 | 0.122 | 0.155 | 0.131 | 0.138 | 0.151 | 0.160 |
| PAYNE EFFECT G' 15%/0.5% | | 24.7% | 44.6% | 51.5% | 55.2% | 48.8% | 46.6% | 43.9% | 43.2% |
| RPA CURE 20° @ 168° C., 1.67 Hz, 1° ARC | | | | | | | | | |
| MIN S' | dNm | 6.81 | 4.19 | 3.51 | 2.99 | 3.52 | 3.63 | 4.08 | 4.14 |
| T' 30 | m.m. | 5.55 | 4.14 | 2.36 | 2.25 | 1.97 | 1.83 | 4.09 | 3.86 |
| T' 95 | m.m. | 10.65 | 7.73 | 7.45 | 7.05 | 5.74 | 5.66 | 8.25 | 8.45 |
| STRESS-STRAIN | | | | | | | | | |
| 300% MODULUS (kgf/cm²) | | 96 | 90 | 129 | 106 | 103 | 111 | 139 | 122 |
| TENSILE (kgf/cm²) | | 220 | 188 | 194 | 179 | 200 | 207 | 201 | 194 |
| ELONGATION (%) | | 574 | 519 | 429 | 462 | 508 | 493 | 414 | 446 |

The improvements in cure/vulcanization acceleration are demonstrated by examples 23 through 28 as reported in Tables 4A and 4B. As shown, the use of the quaternary ammonium chloride compound enables the DPG to be eliminated. Example 23 is a base compound that does not include a coupling agent. As shown by comparison of examples 26 and 24, the addition of the coupling agent to the base compound increases the time to 95% cure by 50%. As shown by example 25, the use of DPG with the coupling agent brings the cure rate back into step with the base compound. Upon addition of the dispersing aid with the coupling agent to the base compound, the cure rate is significantly increased as shown by example 27. Elimination of the DPG still results in a compound having a faster cure than the base compound as shown by example 28. Generally, the largest increases in cure/vulcanization rate have been displayed with quaternary compounds having relatively short alkyl substituents, e.g., R1–R4 each having alkyl groups containing less than eight carbon atoms.

TABLE 4A

| EXAMPLE COMPOUND NUMBER | 23 | 24 | 25 | 26 | 27 | 28 |
|---|---|---|---|---|---|---|
| FIRST NON-PRODUCTIVE STAGE X50S | 0 | 0 | 5 | 5 | 5 | 5 |
| SECOND NON-PRODUCTIVE STAGE X50S | 0 | 0 | 0 | 0 | 0 | 0 |

TABLE 4A-continued

| EXAMPLE COMPOUND NUMBER | 23 | 24 | 25 | 26 | 27 | 28 |
|---|---|---|---|---|---|---|
| FINAL STAGE | | | | | | |
| DISPERSION AID[1] | 0 | 0 | 0 | 0 | 4.05 | 4.05 |
| DPG | 0.8 | 0 | 0.8 | 0 | 0.8 | 0 |

[1]Bardac LF-80 Dioctyl Dimethyl Ammonium Chloride, 80% active from Lonza

TABLE 4B

| EXAMPLE COMPOUND NUMBER | 23 | 24 | 25 | 26 | 27 | 28 |
|---|---|---|---|---|---|---|
| DYNAMIC VISCOELASTIC PROPERTIES | | | | | | |
| ARES @ 0° C., 10 Hz, 0.5% STRAIN TANGENT DELTA @ 0° C. | 0.292 | 0.212 | 0.298 | 0.265 | 0.414 | 0.391 |
| RPA @ 40° C., 20 Hz, 5% STRAIN TANGENT DELTA @ 40° C. | 0.192 | 0.168 | 0.221 | 0.218 | 0.162 | 0.172 |
| PAYNE EFFECT G' 15%/0.5% | 20.5% | 21.8% | 21.5% | 24.1% | 44.3% | 40.0% |

TABLE 4B-continued

| EXAMPLE COMPOUND NUMBER | | 23 | 24 | 25 | 26 | 27 | 28 |
|---|---|---|---|---|---|---|---|
| RPA CURE 20' 169 168° C., 1.67 Hz, 1° ARC | | | | | | | |
| MIN S' | dNm | 10.8 | 14.38 | 7.63 | 7.86 | 3.05 | 3.68 |
| T' 30 | m.m. | 1.53 | 1.01 | 2.26 | 2.5 | 1.2 | 1.4 |
| T' 95 | m.m. | 6.68 | 6.76 | 6.76 | 9.16 | 3.32 | 3.71 |
| STRESS-STRAIN | | | | | | | |
| 300% MODULUS (kgf/cm$^2$) | | 38 | 39 | 77 | 70 | 105 | 103 |
| TENSILE (kgf/cm$^2$) | | 165 | 174 | 200 | 175 | 198 | 200 |
| ELONGATION (%) | | 753 | 800 | 622 | 596 | 498 | 508 |

The mode or mechanism of operation of the quaternary ammonium chloride materials is evaluated in examples 29 through 34 of Tables 5A and 5B. Particularly, it is illustrated that the quaternary compounds do not act as silica to rubber coupling agents. Accordingly, coupling agents remain useful to achievement of good physical properties, but the addition of the dispersing aids improves the physical properties of the compound. Example 29 is the base compound with no coupling agent or dispersing aid. Addition of a coupling agent in example 30 increases the 300% modulus of the compound of example 29. The elimination of the coupling agent and its replacement with a variety of different dispersing aids in examples 31 through 34 results in substantially no increase in the 300% modulus over the control or base example. Accordingly, optimization of properties requires the use of both the dispersing and coupling agents.

TABLE 5A

| EXAMPLE COMPOUND NUMBER | 29 | 30 | 31 | 32 | 33 | 34 |
|---|---|---|---|---|---|---|
| FIRST NON-PRODUCTIVE STAGE | | | | | | |
| X50S | 0 | 5 | 0 | 0 | 0 | 0 |
| DISPERSION AID[1] | 0 | 0 | 5 | 0 | 0 | 0 |
| DISPERSION AID[2] | 0 | 0 | 0 | 8.08 | 0 | 0 |
| DISPERSION AID[3] | 0 | 0 | 0 | 0 | 6.36 | 0 |
| DISPERSION AID[4] | 0 | 0 | 0 | 0 | 0 | 4.05 |
| SECOND NON-PRODUCTIVE STAGE | 0 | 0 | 0 | 0 | 0 | 0 |
| X50S | | | | | | |

TABLE 5A-continued

| EXAMPLE COMPOUND NUMBER | 29 | 30 | 31 | 32 | 33 | 34 |
|---|---|---|---|---|---|---|
| FINAL STAGE DPG | 0.8 | 0.8 | 0 | 0 | 0 | 0 |

[1]Carsoquat SDQ-85-Stearyl Dimethyl Benzyl Ammonium Chloride, 85% active from Lonza
[2]Carsoquat 868P-Dicetyl Dimethyl Ammonium Chloride, 68% active from Lonza
[3]Emcol CC-9-Polyoxypropylene Methyl Diethyl Ammonium Chloride, 98% active from Witco Chemical
[4]Bardac LF-80 Dioctyl Dimethyl Ammonium Chloride, 80% active from Lonza

TABLE 5B

| EXAMPLE COMPOUND NUMBER | | 29 | 30 | 31 | 32 | 33 | 34 |
|---|---|---|---|---|---|---|---|
| DYNAMIC VISCOELASTIC PROPERTIES | | | | | | | |
| ARES @ 0° C., 10 Hz, 0.5% STRAIN TANGENT DELTA @ 0° C. | | 0.230 | 0.320 | 0.304 | 0.342 | 0.316 | 0.295 |
| RPA @ 40° C., 20 Hz, 5% STRAIN TANGENT DELTA @ 40° C. | | 0.163 | 0.201 | 0.113 | 0.116 | 0.149 | 0.131 |
| PAYNE EFFECT G' 15%/0.5% | | 23.6% | 30.0% | 25.7% | 32.9% | 19.2% | 21.7% |
| RPA CURE 20° @ 168° C., 1.67 Hz, 1° ARC | | | | | | | |
| MIN S' | dNm | 8.93 | 6.58 | 5.82 | 2.66 | 6.87 | 9.09 |
| T' 30 | m.m. | 2.16 | 2.59 | 3.75 | 3.12 | 4.66 | 3.65 |
| T' 95 | m.m. | 4.68 | 5.19 | 5.90 | 5.90 | 7.29 | 5.61 |
| STRESS-STRAIN | | | | | | | |
| 300% MODULUS (kgf/cm$^2$) | | 52 | 96 | 44 | 49 | 47 | 50 |
| TENSILE (kgf/cm$^2$) | | 191 | 197 | 157 | 160 | 161 | 177 |
| ELONGATION (%) | | 706 | 529 | 653 | 580 | 609 | 645 |

In summary, the ordered addition of the dispersing agent and the coupling agent enables improvements particularly associated with each agent to be achieved with regulation and/or mitigation of competing effects. In this manner, the undesirable trade-offs in wear, wet traction and rolling resistance are regulated and/or optimized. Further processing advantages include reduction of viscosity of the rubber mixture and suppression of the need for secondary accelerators.

The invention is not restricted to the slavish imitation of each and every detail set forth above. obviously, processes may be provided which change, eliminate, or add certain specific details without departing from the scope of the invention.

I claim:

1. A method of compounding silica in a tire tread composition to suppress tradeoffs in competing properties of wear, wet traction and rolling resistance comprising the steps of:
   (a) mechanically mixing in a plurality of mixing stages: a rubber comprising a conjugated diene, a silica dispersing agent for enhancing the distribution of the silica in the rubber, and a coupling agent for chemical bonding of the rubber to said silica; and
   (b) mixing said rubber and said silica with said coupling agent prior to or contemporaneously with mixing said dispersing agent with said rubber;
   said dispersing agent comprising a quaternary ammonium compound.

2. The method of claim 1, wherein said quaternary ammonium compound has the formula:

R1,R2,R3,NR4X where R1, R2, R3 and R4, which may be the same or different, are alkyl, aryl or polyoxyethylene; and X is halogen.

3. The method of claim 1, wherein said quaternary ammonium compound has the formula:

R1,R2,R3,NR4X where R1, R2, R3 and R4, which may be the same or different, are $C_1$—$C_{18}$ alkyl, benzyl or $C_{15}$ polyoxyethylene; and X is chloride.

4. The method as set forth in claim 1, wherein said rubber is selected from the group consisting of natural rubber, polyisoprene rubber, styrene-butadiene rubber, acrylonitride-butadiene, styrene-isoprene copolymers, isoprene-butadiene copolymer, styrene-isoprene-butadiene tripolymers, and polybutadiene rubber.

5. The method as set forth in claim 4, wherein said dispersing agent is present in an amount in the range of from about 0.5 phr to about 10.0 phr based on the total weight of said rubber.

6. The method as set forth in claim 4, wherein said dispersing agent is present in an amount in the range of from about 4 phr to about 6 phr based on the total weight of said rubber.

7. The method as set forth in claim 5, wherein a decrease in rolling resistance corresponding with a decrease in tangent delta at 40° C. is achieved without a significant reduction in wet traction as indicated by no substantial change in tangent delta at 0° C.

8. The method as set forth in claim 5, wherein a decrease in rolling resistance corresponding with a decrease in tangent delta at 40° C. is achieved and an increase in wet traction as indicated by an increase in tangent delta at 0° C.

9. The method as set forth in claim 8, wherein said improved dispersion of silica and/or better tire wear is indicated by an improved Payne Effect ratio.

10. The method as set forth in claim 5, wherein said dispersing agent increases the cure rate of said rubber.

11. The method as set forth in claim 1, including a final productive mixing step, said dispersing aid being mixed with said silica in a final productive mixing stage.

12. The method as set forth in claim 1, wherein said coupling agent comprises bis[3-triethoxysilylpropyl-] tetrasulfane.

13. A method of compounding silica in a tire tread composition to suppress tradeoffs in competing properties of wear, wet traction and rolling resistance comprising mechanically mixing in a plurality of mixing stages: a rubber comprising a conjugated diene, a silica dispersing agent for enhancing the distribution ot the silica in the rubber, and a coupling agent for chemical bonding of the rubber to said silica,
   (a) mixing said rubber and at least a portion of said silica with at least a portion of said coupling agent prior to or contemporaneously with adding at least some or all of said dispersing agent to form a non-productive mix,
   (b) mixing said non-productive mix from step (a) in one or more additional mixing steps with addition of any remaining silica, dispersing agent and coupling agent to form a productive mix having an improved dispersion of said silica therein, said dispersing agent comprising a quaternary ammonium chloride compound.

14. The method as set forth in claim 13, wherein said at least one non-productive mix is formed at a temperature of up to 320° F.

15. The method as set forth in claim 14, wherein said productive mix is formed at a temperature of up to 250° F.

16. The method as set forth in claim 15, wherein all of said dispersing agent is added in said productive mix.

17. A sulfur-vulcanizable composition formed by the steps of:
   (a) mechanically mixing in a plurality of mixing stages: a rubber comprising a conjugated diene, a silica dispersing agent comprising a quaternary ammonium compound for enhancing the distribution of the silica in the rubber, and a coupling agent for chemical bonding of the rubber to said silica; and
   (b) mixing said rubber and said silica with said coupling agent prior to or contemporaneously with mixing said dispersing agent with said rubber;
   whereby tradeoffs in competing properties of wear, wet traction and rolling resistance are suppressed.

18. The composition of claim 17, wherein said quaternary ammonium compound has the formula:

R1,R2,R3,NR4X where R1, R2, R3 and R4, which may be the same or different, are alkyl, aryl or polyoxyethylene; and X is halogen.

19. The composition of claim 17, wherein said quaternary ammonium compound has the formula:

R1,R2,R3,NR4X where R1, R2, R3 and R4, which may be the same or different, are $C_1$—$C_{18}$ alkyl, benzyl or $C_{15}$ polyoxyethylene; and X is chloride.

20. The composition of claim 19, wherein said rubber is selected from the group consisting of natural rubber, polyisoprene rubber, styrene-butadiene rubber, acrylonitride-butadiene, styrene-isoprene copolymers, isoprene-butadiene copolymer, styrene-isoprene-butadiene tripolymers, and polybutadiene rubber.

21. The composition of claim 20, wherein said coupling agent comprises bis[3-triethoxysilylpropyl-] tetrasulfane.

* * * * *

UNITED STATES PATENT AND TRADEMARK OFFICE
CERTIFICATE OF CORRECTION

PATENT NO. : 6,025,428
DATED : February 15, 2000
INVENTOR(S) : Gary L. Day

It is certified that error appears in the above-indentified patent and that said Letters Patent is hereby corrected as shown below:

Column 2, line 4, delete "(carbon" and insert --carbon--;

Column 3, line 46, delete "Rhoclia" and insert --Rhodia--;

Column 8, Table 3A, Example 16 of Dispersion Aid$^1$, delete "0" and insert --5--;

Column 8, Table 3A, Example 21 of Dispersion Aid$^1$, insert --0--;

Column 8, Table 3A, Example 22 of Dispersion Aid$^1$, insert --0--;

Column 8, Table 3A, Example 21 of Dispersion Aid$^2$, insert --0--;

Column 8, Table 3A, Example 22 of Dispersion Aid$^2$, insert --0--;

Columns 9 and 10, Table 3B, Example 18 of 300% Modulus (kgf/cm$^2$), delete "106" and insert --108--;

Columns 11 and 12, Table 4B-continued, delete "RPA CURE 20' 169" and insert --RPA CURE 20'--.

UNITED STATES PATENT AND TRADEMARK OFFICE
CERTIFICATE OF CORRECTION

PATENT NO. : 6,025,428
DATED : February 15, 2000
INVENTOR(S) : Gary L. Day

It is certified that error appears in the above-indentified patent and that said Letters Patent is hereby corrected as shown below:

Columns 11 and 12, Table 5B, Example 32 of MIN S', delete "2.66" and insert --2.86--;

Column 14, line 6 (claim 13, line 6), delete "ot" and insert --of--.

Signed and Sealed this

Sixth Day of February, 2001

Attest:

Q. TODD DICKINSON

Attesting Officer

Director of Patents and Trademarks